Sept. 19, 1939.   A. L. NICHOLS   2,173,424
VINE STRIPPER AND SEED HULLER
Filed July 18, 1938
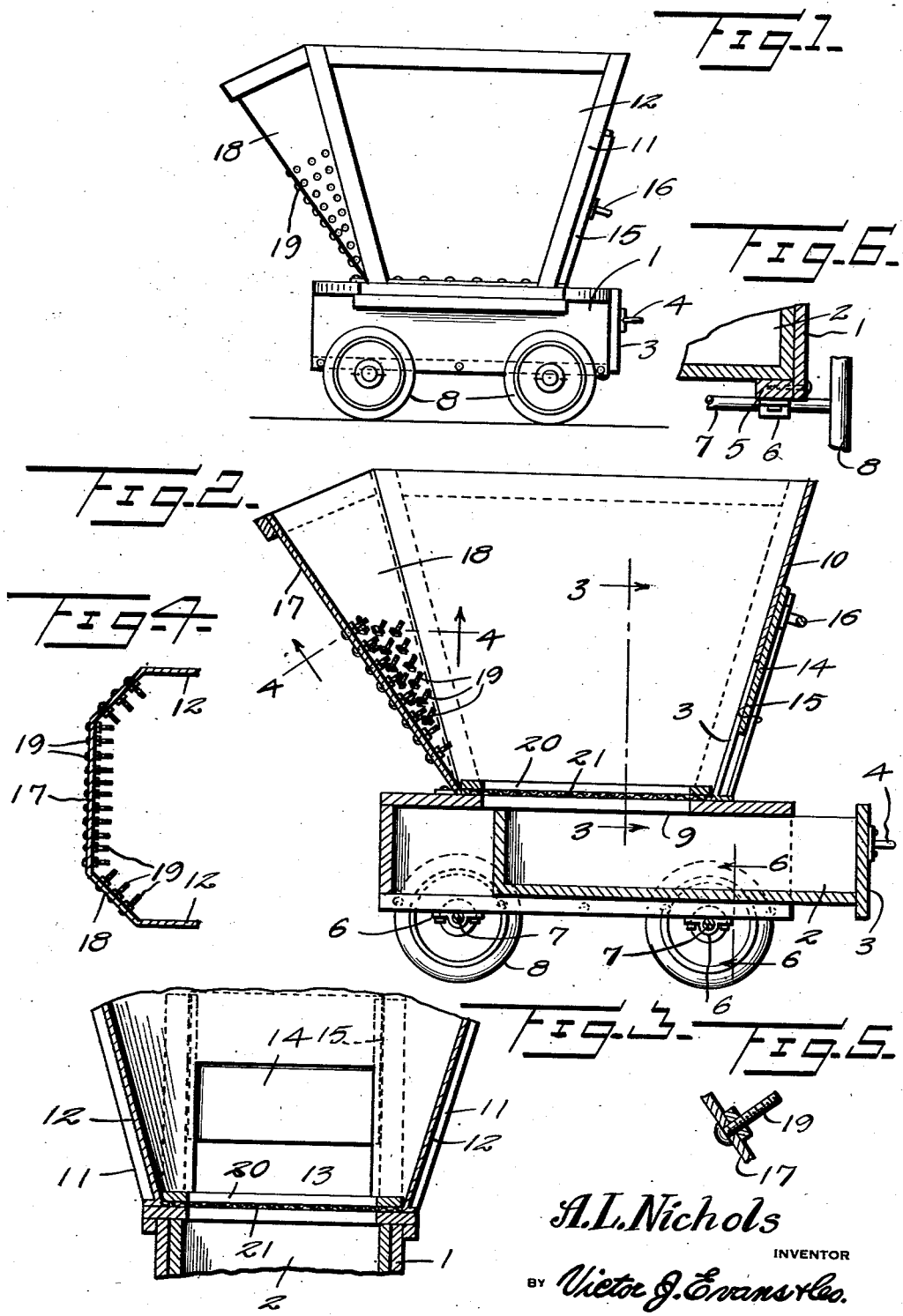
A. L. Nichols
INVENTOR
BY Victor J. Evans & Co.
ATTORNEYS Patented Sept. 19, 1939

2,173,424

UNITED STATES PATENT OFFICE 2,173,424

VINE STRIPPER AND SEED HULLER

Arthur L. Nichols, Nichols, Wis.

Application July 18, 1938, Serial No. 219,873

2 Claims. (Cl. 130—30)

This invention relates to seed hullers and its general object is to provide a wheeled or portable vine stripper and seed huller, that can be readily moved between rows of growing crop, such as beans or the like, for use in stripping the vines and hulling the beans or seeds from the pods, the vines being first cut or pulled and then beatened on the stripping and hulling means or thrashing apron of my device, with the result it will be seen that the matured or dried portion of a crop can be harvested and seeded in the field, without damaging that portion of the crop that has not yet matured, therefore the crop may be harvested from time to time as it matures, as distinguished from the present method of harvesting the entire crop at one time and commingling matured and immatured seeds, which must be later separated.

A further object is to provide a vine stripper and seed huller that separates vine portions and pods from the seeds, the latter being caught in a receptacle in the form of a drawer that is removable from the device to be emptied, as will be apparent.

Another object is to provide a vine stripper and seed huller that is simple in construction, easy to propel, inexpensive to manufacture, and extremely efficient in use, operation and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation of the device which forms the subject matter of the present invention.

Figure 2 is a vertical sectional view taken through the device.

Figure 3 is a sectional view taken approximately on line 3—3 of Figure 2, looking in the direction of the arrows.

Figure 4 is a sectional view taken approximately on line 4—4 of Figure 2, looking in the direction of the arrows.

Figure 5 is a detail sectional view illustrating one of the stripping or thrashing teeth.

Figure 6 is a sectional view taken approximately on line 6—6 of Figure 2, looking in the direction of the arrows.

Referring to the drawing in detail, the reference numeral 1 indicates the body of my device which is shown as being hollow and of substantially flat rectangular formation having an open rear end for the passage of a seed drawer 2 that is slidably mounted in the body, as best shown in Figure 2. The seed drawer includes a front wall or plate 3 that extends beyond the bottom and side walls for engagement with the rear end of the body 1 to limit the inward movement of the drawer, as will be apparent. A handle 4 is secured to the front wall 3 to facilitate the application and removal of the drawer with respect to the body.

The body 1 preferably has its lower portion open, and secured to the inner sides of the side walls of the body to extend longitudinally thereof are strips 5, which act as runners for the drawer, as best shown in Figure 6, and secured to the undersurface of the strips 5 are bearing members or brackets 6 for axles 7, the latter having wheels 8 journaled on the ends thereof, and the wheels are preferably provided with rubber tires.

The upper wall of the body has an opening 9 therein, and secured to the upper wall for disposal about the same is a hopper 10 which includes wall portions outwardly flared from the upper wall. The hopper walls are made up of frames 11 in the form shown, with panel portions 12 of sheet metal or the like secured to the frames and the lower ends of the frames are fixed to the body, while the lower edges of the panel portions are bent outwardly at angles and likewise fixed to the body by nails or the like as shown. The front wall panel portion is provided with a door opening 13, at its lower portion, for the easy removal of hulls, and foreign matter from the hopper, and the opening is closed by a sliding door 14 mounted in guide strips 15 secured to the frame of the front wall, and the door 14 is provided with a handle 16.

The rear wall of the hopper is of angular formation in cross section, in that it includes a rear portion 17 and side portions 18, the latter being disposed in converging relation with respect to each other and toward the rear portion 17, as best shown in Figure 4, and the rear and side portions 17 and 18 have headed screw bolts 19 extending therethrough in row formation, with the shanks thereof disposed within the hopper and the screw bolts are fixed to the portions by nuts as shown.

It will be obvious that the screw bolts provide teeth and cooperate with the portions 17 and 18 to provide what may be termed a thrashing apron.

Mounted in the bottom of the hopper to rest upon the upper wall of the body and for disposal across the opening 9 is a screening member 20 that includes a frame as shown and a wire mesh screening element 21 fixed to the frame.

From the above description and disclosure in the drawing, it will be obvious that my seed huller is propelled by pushing or pulling the same between rows of growing crop such as beans or the like, and when a matured or dried portion of the crop has been reached, the vines are pulled from the ground or cut, and thence pounded or beaten upon or pulled through the teeth of the thrashing apron for removing the seeds from the pods.

It will be apparent that the pods and portions of the vine will fall and collect upon the screening member 20, while the seeds will pass therethrough into the drawer 2. When the matured portion of the crop referred to has been thrashed, the huller can then be moved to another matured portion, and so on, therefore it will be further obvious that the crops can be harvested from time to time as it matures, without interference to the immature portions of the crops. While my huller is primarily designed for the purpose set forth, it will be apparent that its use is not necessarily confined for work in a field, and that it can be used at any time for hulling any kind of seeds.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A portable seed huller comprising a hollow substantially flat rectangular body and having an opening in the upper wall thereof, ground engaging wheels for said body, a hopper mounted on the body about the opening and having an opening in the front wall thereof, a handled slidably mounted door for closing the opening of the hopper, headed bolts extending through the rear wall of the hopper and secured thereto with their shanks within the hopper to provide with the rear wall a thrashing apron, screening means resting upon the upper wall of the body about the opening thereof for disposal between the body and the hopper, and handled seed receiving means removably mounted in said body.

2. A portable seed huller comprising a hollow body having an open end, rail strips secured to the underside of said body, bearing means secured to said strips, axles mounted in said bearing means, ground engaging wheels journaled on said axles, an outwardly flared walled hopper mounted on and communicating with said body and having an opening in the front wall thereof, a door for said opening, a rear and side wall portions for the rear wall of the hopper, said side wall portions converging toward the rear wall portion, teeth arranged in row formation on the rear and side wall portions and extending into the hopper to provide with said wall portions a thrashing apron, screening means between the hopper and the body, and a handled seed drawer slidably mounted on the rail strips for removal from the body and normally disposed in the path of seeds from the hopper.

ARTHUR L. NICHOLS.